United States Patent [19]

Spivey

[11] 3,939,815

[45] Feb. 24, 1976

[54] ENGINE STARTER AND BRACKET

[76] Inventor: Donald K. Spivey, 3645 N. 50th St., Tampa, Fla. 33619

[22] Filed: Nov. 19, 1974

[21] Appl. No.: 525,206

[52] U.S. Cl. .............. 123/185 BA; 29/401 D; 74/6; 248/223

[51] Int. Cl.[2] .......................... F02N 3/02; B23P 7/00

[58] Field of Search ......... 74/6; 123/179 SE, 185 B, 123/185 BA; 248/223; 29/401, 453

[56] References Cited

UNITED STATES PATENTS

| | | | |
|---|---|---|---|
| 2,872,144 | 2/1959 | Hobson | 248/223 |
| 3,219,405 | 11/1965 | Costantini et al. | 248/223 X |
| 3,368,267 | 2/1968 | Hedberg | 29/453 X |
| 3,754,543 | 8/1973 | Harkness | 123/185 B |
| 3,809,799 | 5/1974 | Taylor | 248/223 X |

*Primary Examiner*—Allan D. Herrmann
*Attorney, Agent, or Firm*—Robert F. Ruemeli

[57] ABSTRACT

In an engine assembly including a starter mechanism having a housing receiving a starter rope reel normally retained in the housing by ears integral with the housing and bent inwardly to underlie the reel; the provision of one or more brackets for supporting the reel in the event that one or more ears are damaged or broken off while being bent during removal or installation of the reel, as during replacement of the reel starting rope, for example. Columns support a reel receiving portion of the housing on a lower part of the housing. The brackets clamp to these columns and have an abutment on which the periphery of the reel is surmounted. Each bracket has opposed channels and is somewhat resilient to snap over and receive opposite edge portions of the column in the channels. The brackets are preferably formed of a heat and lubicant resistent plastic such as molded nylon.

11 Claims, 7 Drawing Figures

ENGINE STARTER AND BRACKET

This invention relates to an engine starter and, more particularly, to a repair bracket for the starter mechanism.

BACKGROUND OF THE INVENTION

For many years Briggs and Stratton has built engines with top recoil starters in which a starting rope is pulled generally horizontally in order to start the engine. Engines of this type are extensively used on lawn mowers. After a period of time the starting rope must be replaced. In order to replace the starting rope it is necessary to remove its reel which is mounted in an upper housing of the engine and is retained therein by ears formed integrally with the housing and bent inwardly to underlie and support the reel. As these ears are bent during removal or replacement of the reel, they are likely to be damaged or to be broken off. It has previously been necessary to replace the entire upper housing when the reel supporting ears were broken off. This resulted in discarding on otherwise usable housing, and an ever increasing expenditure of money for a new housing.

The repair bracket of this invention obviates the necessity for replacing the housing in the event that the reel supporting ears are broken off of the housing. Each bracket is adapted to snap over a supporting column of the housing and to receive opposite edge portions of the column in opposed channels of the bracket, thereby positioning inwardly extending abutment of the bracket to receive and retain the starting rope reel operatively positioned within the housing.

It is a primary object of this invention to provide a new and useful starter mechanisim for an engine. It is a more specific object to provide a new and useful top recoil starter mechanisim in which a reel carrying a starter rope is retained in place by one or more supporting brackets secured to a housing of the mechanisim. A related object is provision of such a bracket having opposed channels adapted to be snapped over a portion of the housing, and an abutment on the bracket adapted to underlie and support the reel. Another related object is provision of a plurality of such brackets spaced along the periphery of the reel.

Still another object is provision of a new and useful repair bracket for supporting the starter rope reel of a top recoil starting mechanisim of an engine. A related object is provision of such brackets for replacing ears formed integrally with a starter housing and normally supporting the reel, in the event that the ears become damaged, or broken off of the housing.

A further object is provision in an assembly including a bracket mounted on a support having opposite edge portions, the bracket including a body having a face and an end portion, and further including a portion for mounting the bracket on the support, the mounting portion extending outwardly from the face of the body and including opposed channels, one for each of the support edge portions, the channels being transverse to the body end portion, and the body further including a portion for supporting an article, the supporting portion being proximate the body end portion and extending in a direction opposite that of the mounting portion. A related object is provision of the mounting portion having opposed flanges transverse to the body end portion and extending outwardly from the body face and the channels being in the flanges, and the supporting portions having an abutment for supporting the article, the abutment being generally intermediate the flanges, and the body end portion having shoulders spaced inwardly of the abutment with the shoulders extending from the abutment in opposite directions and past the adjacent one of the flanges. Another related object is provision of the abutment having an end surface supporting the reel and the abutment surface being at an oblique interior angle to the longitudinal axis of the channels. Still another related object is provision of the assembly including a starter mechanisim with a starter housing having a portion for receiving the article and the support depending from the article receiving portion, and the article supporting portion of the bracket being below and in abutting engagement with the article. Still another related object is provision in the starter mechanisim of the article in the form of a starter reel normally retained in the receiving portion of the housing by ears integral with the receiving portion and bent inwardly to underlie and support the reel, the ears being subject to breaking off when bent for removal or replacement of the reel, provision of a plurality of the housing supports spaced apart and depending from the receiving portions for receiving the brackets, whereby the brackets substitute for broken one of the ears in supporting the ears.

These and other objects and advantages of the invention will be apparent from the following descriptions and the accompanying drawings.

DESCRIPTION OF THE ILLUSTRATED EMBODIMENT

Figure 1:
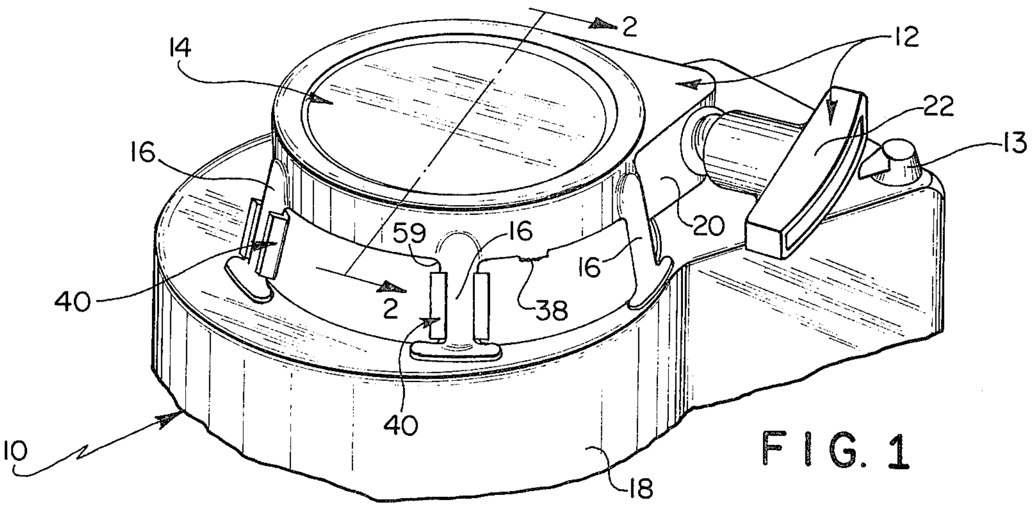
FIG. 1 is a fragmentary, schematic perspective view looking downwardly on an upper housing of a top recoil starter mechanisim for an engine and, more particularly, a Briggs and stratton engine of the type commonly used on lawn mowers.
Figure 2:
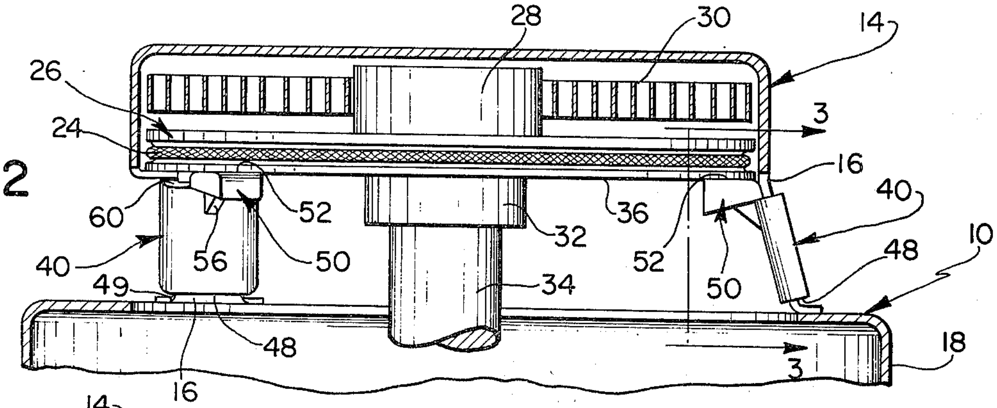
FIG. 2 is an enlarged, fragmentary, schematic, elevational sectional view taken generally along the line 2—2 in FIG. 1, and showing brackets supporting a starter rope reel of the starter mechanisim.
Figure 3:
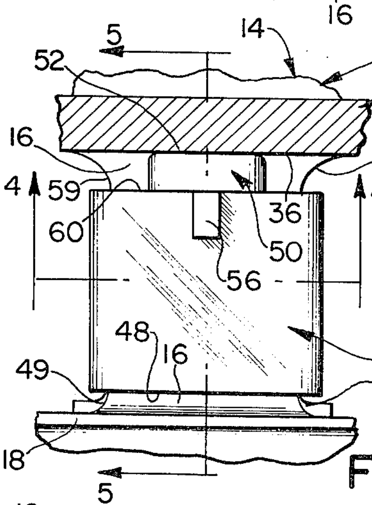
FIG. 3 is an enlarged, fragmentary, schematic, elevational sectional view taken generally along the line 3—3 in FIG. 2, and showing details of the brackets.
Figure 4:
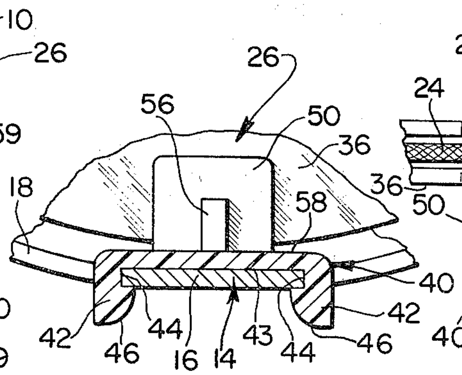
FIG. 4 is a fragmentary, schematic bottom sectional view taken generally along the line 4—4 in FIG. 3.
Figure 5:
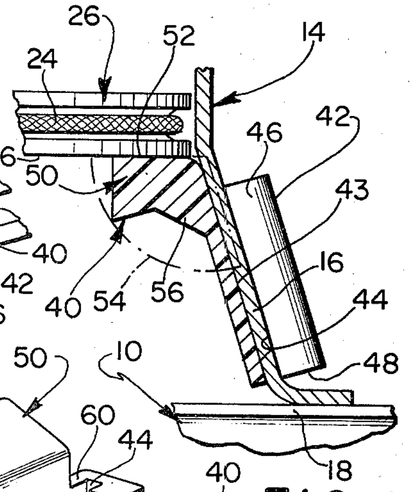
FIG. 5 is a fragmentary, schematic, elevational sectional view taken generally along the line 5—5 in FIG. 3.
Figure 6:
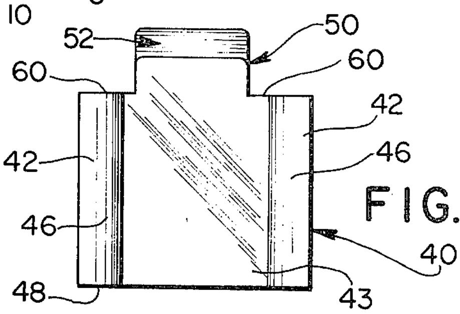
FIG. 6 is an elevational view of a face of the bracket opposite that shown in FIG. 3, and enlarged over that shown in FIG. 1.
Figure 7:
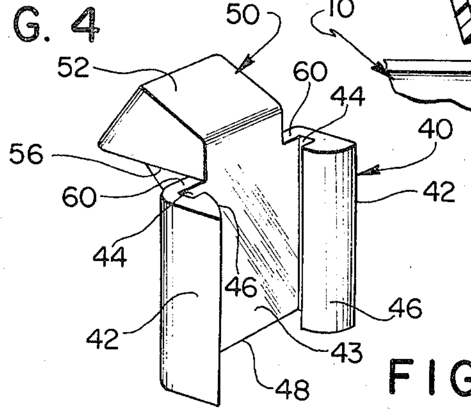
FIG. 7 is a perspective view of a bracket removed from the housing.

Referring to the drawings, FIG. 1 shows a portion of an upper housing 10 of a typical Briggs and Stratton lawn mower engine having a top recoil starter mechanisim 12. A speed control knob 13 is carried atop the housing 10. A top portion 14 of the housing 10 is integrally formed with a plurality of depending columns 16 fixedly secured to a lower portion 18 of the housing 10. Seated against a protrusion 20 of the top portion 14 is a handle 22 on the free end of a starter rope 24 (FIG. 2), the handle 22 being pulled generally horizontally outwardly in typical manner for starting the engine.

is at an oblique interior angle to the longitudinal axes of said channels.

7. The starter mechanism as set forth in claim 6 in which the bracket is integrally molded nylon.

8. An article supporting bracket to be mounted on a support having opposite edge portions, said bracket comprising, a body having a face and an end portion, said body including means for mounting the bracket on the support, the mounting means extending outwardly from said face and including opposed channels, one for each of the support edge portions, for receiving the associated one of the support edge portions, the channels being transverse to the body end portion, said body further including means for supporting an article, the supporting means being proximate said end portion and extending in a direction opposite that of the mounting means, the mounting means being relatively resilient for snappping over and gripping the support edge portions, and the supporting means being relatively rigid for effectively rigidly supporting the article.

9. A bracket as set forth in claim 8 in which said mounting means includes opposed flanges transverse to the body end portion and extending outwardly from said face of said body and said channels being in said flanges, and said supporting means includes an abutment for supporting the article, said abutment being generally intermediate said flanges, and said body end portion having shoulders extending outwardly from the abutment in opposite directions and one along each end of an adjacent one of the flanges.

10. A bracket as set forth in claim 8 in which said abutment is an end surface of said body and is at an oblique interior angle to the longitudinal axes of said channels.

11. A bracket as set forth in claim 10 in which said body is an integral molded nylon unit said mounting means includes opposed flanges transverse to the body end portion and extending outwardly from said face of said body and said channels being in said flanges, and said supporting means includes an abutment for supporting the article, said abutment being generally intermediate said flanges, and said body end portion having shoulders extending outwardly from the abutment in opposite directions and one along each end of an adjacent one of the flanges.

* * * * *